3,511,829
PHENYLAZOAMINONAPHTHOL DYES
William H. Armento, Albany, N.Y., assignor to GAF Corporation, a corporation of Delaware
No Drawing. Filed July 27, 1967, Ser. No. 656,319
Int. Cl. C07c 107/08; C09b 29/30
U.S. Cl. 260—199                    7 Claims

ABSTRACT OF THE DISCLOSURE

Dyes selected from the formulae:

(I)
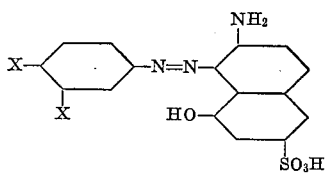

and (II)
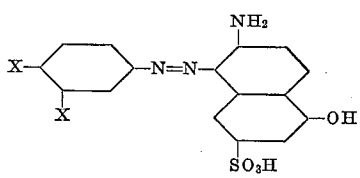

wherein one X is hydrogen, the other X being a radical of the formula —COOR, R being an alkyl radical of from about four to about eight carbon atoms.

The dyes are produced by coupling aminobenzoic acid esters with 6- or 7-amino-4-hydroxy-2-naphthalenesulfonic acid under acid conditions of coupling.

---

The present invention is directed to novel azo dyes and a process for producing the same and more particularly to novel azo dyes produced by coupling aminobenzoic acid esters wherein the ester group has four to eight carbon atoms with 6- or 7-amino-4-hydroxy-2-naphthalenesulfonic acid under acid conditions of coupling.

The dyes of the present invention are especially useful in the dyeing of fabrics, particularly nitrogenous material such as wool, and especially nylon. The dyes of the present invention are characterized by yielding bright reddish dyeings on nylon and similar material, such dyeings having excellent light fastness and wash fastness, and are level dyeings with good build-up.

It has been known in the past to employ aminobenzoic acid esters as diazo bases in the production of azo dyes. For example, British Pat. 261,769 discloses the employment of aminobenzoic acid esters as diazo bases to be coupled with aminonaphtholsulfonic acids. According to the process of such British patent, however, the aminobenzoic acid esters and the aminonaphtholsulfonic acids are coupled under alkaline conditions, wherein the azo group is ortho to the hydroxyl group of the coupling component. The resulting product from such alkaline condition coupling is a dye having entirely different properties and shades from the dyes of the present invention.

Similarly, U.S. Pat. 2,898,178 discloses the employment of aminobenzoic acids as diazo bases in the production of azo dyes. In accordance with this patent, however, the coupler component is a pyrazolone compound, the final dye being free from sulfonic acid groups and having entirely different properties and uses from those of the dyes of the present invention.

It has now been found in accordance with the present invention that it is possible to produce dyes which yield bright, esthetic, reddish dyeings on nylon and similar materials by coupling, under acid conditions, an aminobenzoic acid ester as the diazo base with 6- or 7-amino-4-hydroxy-2-naphthalenesulfonic acid. The esthetic reddish dyeings produced in accordance with the present invention on nylon and similar materials have excellent light fastness and wash fastness and are extremely level dyeings with excellent build-up.

It is therefore a principal object of the present invention to provide novel azo dyes especially useful in the dyeing of nitrogenous materials, particularly nylon.

It is a further object of the present invention to provide novel dyes which are characterized by giving bright reddish dyeings on nylon.

It is yet a further object of the present invention to provide novel dyes produced by coupling under acid conditions an aminobenzoic acid ester as the diazo base with 6- or 7-amino-4-hydroxy-2-naphthalenesulfonic acid.

A still further object of the present invention is to provide a process for producing novel dyes wherein an aminobenzoic acid ester is coupled with 6- or 7-amino-4-hydroxy-2-naphthalenesulfonic acid under acid conditions.

Still further objects and advantages of the novel dyes and process of the present invention will become more apparent from the following more detailed description of the present invention.

The dyes of the present invention are selected from the formulae:

(I)
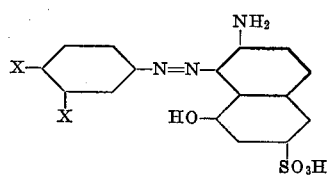

and (II)
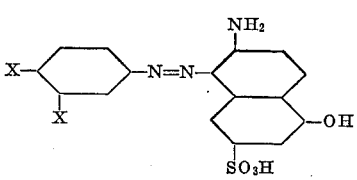

wherein one X is hydrogen, the other being a radical of the formula —COOR, R being an alkyl radical of from about four to about eight carbon atoms. Exemplary dyes falling within the generic formulae set forth above include the following:

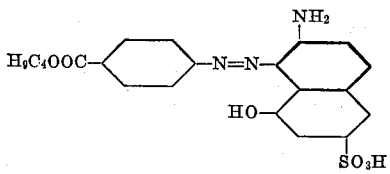

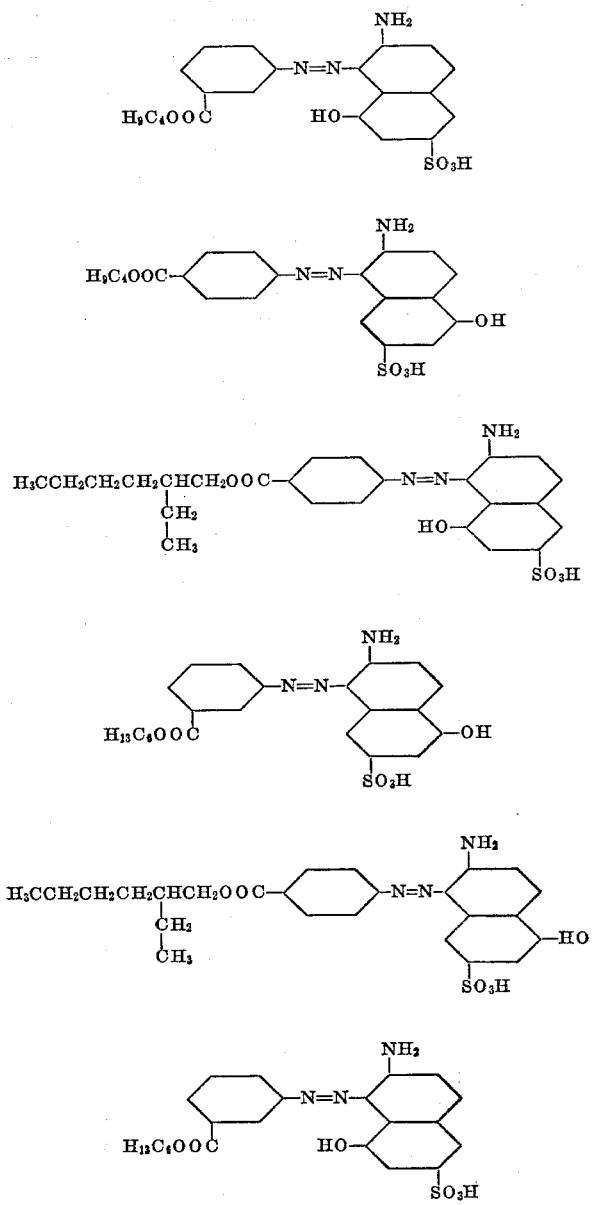

The dyes of the present invention are prepared by diazotizing in a conventional manner an alkyl meta- or para-aminobenzoate with coupling of the diazotized reactant under acidic conditions with a coupler selected from 6- or 7-amino-4-hydroxy-2-naphthalenesulfonic acid. During the coupling reaction, the pH of the system generally is in the range of one to about six.

It has been found particularly suitable to dissolve the coupler in an alkaline solution with an adjustment with acid to the pH point at which the actual coupling occurs under acid conditions. The dye produced by this reaction is sufficiently insoluble that it precipitates readily. To recover the dye, it is filtered, washed with water or, if desired, a saline water, and then dried.

The diazotization of the alkaline meta- or para-aminobenzoate can be accomplished in any conventional manner generally employed in the production of azo dyes. Thus, for example, a generally used process comprises the employment of sodium nitrite to diazotize a hydrochloric acid solution of the diazotizable material.

Exemplary alkyl meta- and para-aminobenzoates which can be employed in accordance with the present invention comprise the following:

butyl m-aminobenzoate
butyl p-aminobenzoate
isobutyl p-aminobenzoate
tert-butyl p-aminobenzoate
amyl p-aminobenzoate
hexyl p-aminobenzoate
octyl m-aminobenzoate
octyl p-aminobenzoate
2-ethyl-1-hexyl p-aminobenzoate, etc.

As noted above, the coupling component employed in accordance with the present invention is a compound selected from 6- or 7-amino-4-hydroxy-2-naphthalenesulfonic acid. Such a compound is coupled with the alkyl meta- or para-aminobenzoate under acid conditions so as to produce the novel dyes in accordance with the present invention.

In general, the temperature of coupling is not critical and the coupling reaction under acid conditions can be accomplished under those conditions generally employed in similar coupling reactions.

The following examples illustrate various embodiments of the present invention. It is to be understood that these examples are for purposes of illustration only, and the present invention is in no way to be deemed as limited thereto.

EXAMPLE I 29 parts butyl p-aminobenzoate were slurried with 195 parts water and 53.5 parts of hydrochloric acid (20° Bé.). The solution was then clarified by treating with activated carbon and filtered.

Then eleven parts of sodium nitrite solution (31.5%) were diluted with 150 parts of water, cooled to approximately 0° C. with 216 parts of ice and acidified with 35.7 parts of hydrochloric acid.

The butyl p-aminobenzoate solution was then run into the nitrous acid solution with stirring while maintaining excess nitrite and excess acidity. After 30 minutes, the excess nitrite was destroyed.

Some 39.0 parts of 6-amino-4-hydroxy-2-naphthalenesulfonic acid were dissolved in 250 parts water and 6.5 parts caustic soda liquid (30% by weight). After icing to 0° C. with 136 parts ice, 1.5 parts glacial acetic acid were added carefully. The diazo solution was then added, the charge stirred overnight, warmed slowly to 45–50 degrees C., and filtered. The presscake was washed with a salt solution at 40° C., and then dried. The dyestuff had the formula:

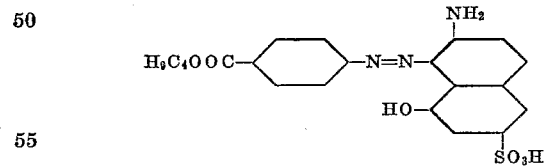

The product is a dye which gives red dyeings on nylon having excellent fastness properties.

EXAMPLE II

In the manner of Example I, 29 parts of diazotized butyl m-aminobenzoate were coupled with 39 parts 6-amino-4-hydroxy-2-naphthalenesulfonic acid to give a dye which has the formula:

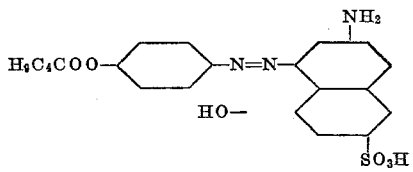

The product colors nylon in yellow-reddish shades having excellent fastness properties.

EXAMPLE III

In the manner of Example I, 29 parts of diazotized butyl p-aminobenzoate were coupled with 39.0 parts 7-amino-4-hydroxy-2-naphthalenesulfonic acid to give a red nylon dye which has excellent fastness properties. The dye had the formula:

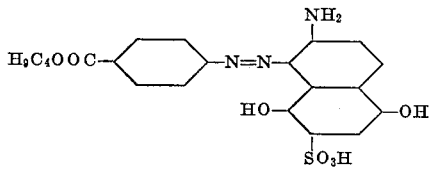

EXAMPLE IV

In the same manner as Example I, 36 parts of diazotized 2-ethyl-1-hexyl p-aminobenzoic acid were coupled with 39 parts of 6-amino-4-hydroxy-2-naphthalenesulfonic acid to give a red nylon dye which has excellent fastness properties. The dye had the formula:

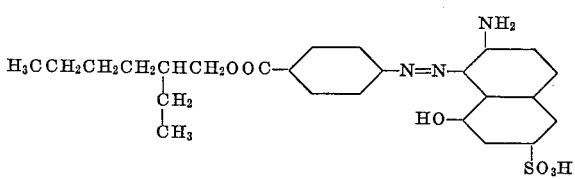

EXAMPLE V

In the same manner as Example I, 32.5 parts of diazotized hexyl m-aminobenzoate were coupled with 39 parts of 7-amino-4-hydroxy-2-naphthalenesulfonic acid to give a red nylon dye having excellent fastness properties. The dye had the formula:

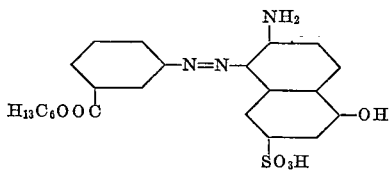

EXAMPLE VI

In order to illustrate the dyeing effectiveness of the dyes produced in accordance with the present invention, an aqueous bath was prepared containing one percent of the dye of Example I O.W.F. and six percent ammonium sulfate O.W.F. A swatch of nylon fabric was dyed in a conventional manner by dipping the nylon swatch into the aqueous bath containing the dye. The nylon swatch was dyed an extremely level, esthetic red shade, the dying having excellent fastness to light, washing and fulling.

EXAMPLE VII

In order to further show the dyeing effectiveness of the dyes produced in accordance with the present invention, a second dyeing was made as follows:

An aqueous bath was prepared to contain one percent of the dye of Example I O.W.F., 15 percent sodium sulfate O.W.F., and six percent ammonium sulfate O.W.F. A wool swatch was dyed in this bath at a boil for one hour with subsequent rinsing and drying. Here again, the wool was dyed a level red shade which had excellent fastness to light, washing and fulling.

EXAMPLE VIII

In order to demonstrate the unexpected results associated with the employment of acid coupling conditions in accordance with the present invention, a comparative test was made utilizing both acid conditions and basic conditions in the production of dyes utilizing the reactants of Example I.

The first dye was prepared as in Example I with the acidity of coupling ranging from a pH of about six to about one as the coupling progressed. The dye produced by such acid coupling had the formula:

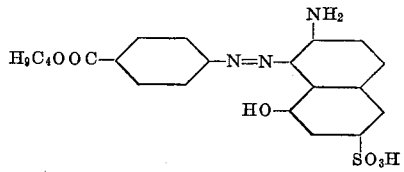

A second dye was prepared in the same manner except that the pH was maintained at nine to ten throughout the coupling. Such pH was maintained by the addition of alkali. The dye produced by the basic coupling corresponds to the formula:

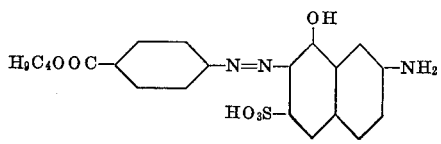

Dyeings were made in the manner described in Example VII using each of the dyes produced. The dye preparation utilizing acid coupling conditions in accordance with the present invention produced a bright, esthetic, reddish dyeing, while the dye produced under alkali coupling conditions produced a much less esthetic, brownish-maroon dyeing. A wash fastness test also indicated great superiority with respect to fastness for the dye produced in accordance with the present invention under acid coupling conditions.

An exposure test conducted also showed a great superiority for the dye produced under acid coupling conditions. Here, the dye produced under alkali coupling conditions showed a distinct break after 24 hours in a xenon fadeometer test wherein no such break was shown in a similar test of the dye produced in accordance with the present invention.

The above example clearly shows the unexpected nature of the dyes produced in accordance with the present invention wherein a diazotized aminobenzoic acid ester is coupled with 6- or 7-amino-4-hydroxy - 2 - naphthalenesulfonic acid under acid conditions. As noted above, the dyes produced are extremely effective in producing bright, esthetic, reddish dyeings on fabrics, particularly nitrogenous fabrics, such as wool, nylon, etc. The dyeings produced have excellent light fastness and wash fastness, and are level with excellent build-up.

While various embodiments of the present invention have been described by reference to the foregoing specific examples, it is to be understood that the present invention is in no way to be deemed as limited thereto, but should be construed as broadly as all or any equivalents thereof.

I claim:
1. Dyes selected from the formulae:

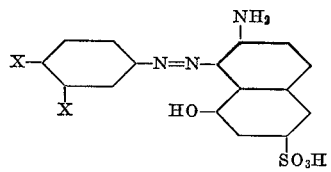

and

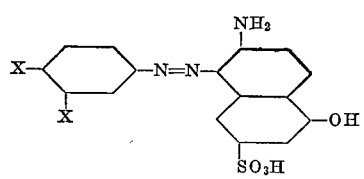

wherein one X is hydrogen, the other X being a radical of the formula —COOR, R being an alkyl radical of from four to eight carbon atoms.

2. The dye of claim 1 wherein R is a butyl radical.

3. The dye of claim 1 wherein said dye corresponds to the formula:

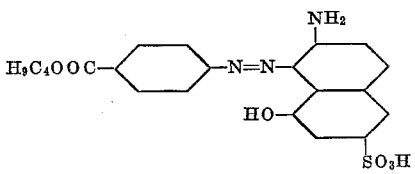

4. The dye of claim 1 wherein said dye corresponds to the formula:

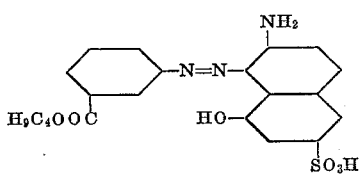

5. The dye of claim 1 wherein said dye corresponds to the formula:

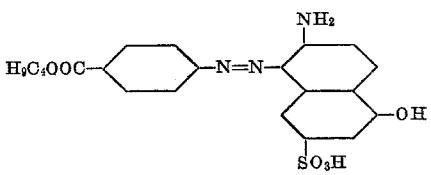

6. The dye of claim 1 wherein said dye corresponds to the formula:

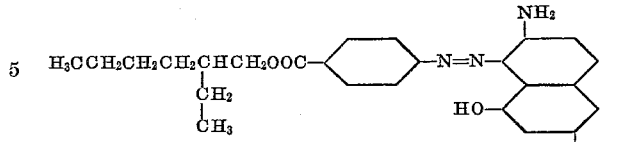

7. The dye of claim 1 wherein said dye corresponds to the formula:

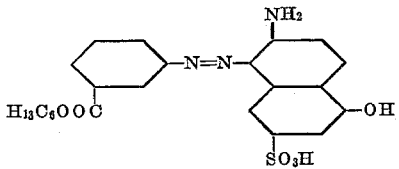

References Cited

FOREIGN PATENTS 261,769  11/1926  Great Britain.

OTHER REFERENCES

Zollinger, Azo and Diazo Chemistry: Aliphatic and Aromatic Compounds, Interscience Publishers, Inc., New York, 1961, p. 260.

CHARLES B. PARKER, Primary Examiner

C. F. WARREN, Assistant Examiner

U.S. Cl. X.R.

8—41